June 13, 1939.  A. A. THOMAS  2,162,234
ELECTRONIC DEVICE
Filed May 14, 1937
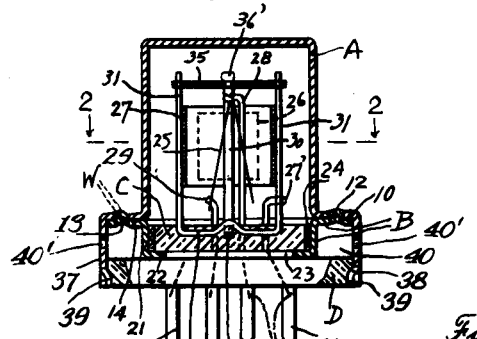
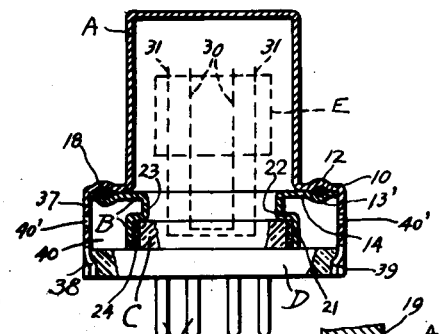
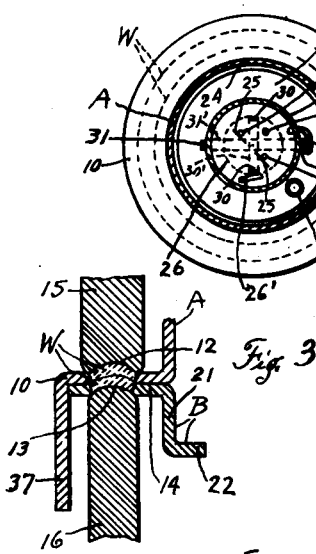
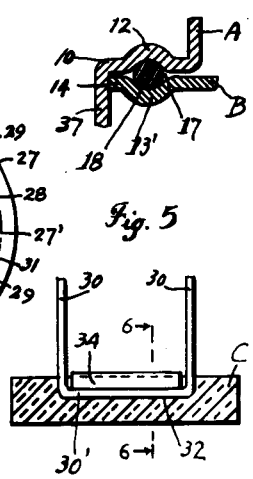
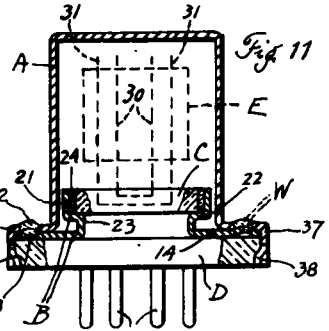
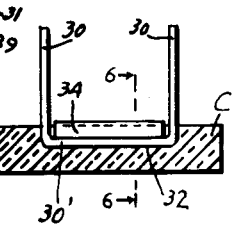
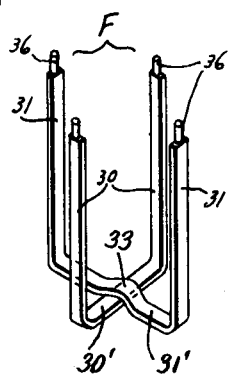
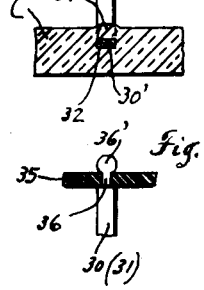
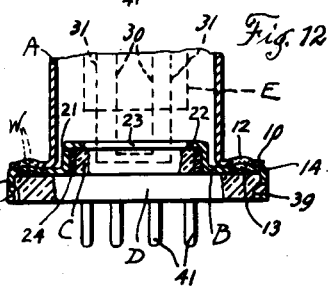
Inventor
Adolph A. Thomas Patented June 13, 1939

2,162,234

UNITED STATES PATENT OFFICE 2,162,234

ELECTRONIC DEVICE

Adolph A. Thomas, New York, N. Y., assignor to Radio Corporation of America, a corporation of Delaware Application May 14, 1937, Serial No. 142,545

11 Claims. (Cl. 250—27.5)

This invention relates to electric discharge devices, and its object is to produce an improved metal tube embodying certain novel features which result in practical advantages over prior devices of that type. My new metal electron tube is especially adapted for use in radio apparatus, although the invention is not limited to that field.

Briefly stated, the main features of novelty that characterize my invention include an arched form of electric weld between the metal shell and base member of the envelope, an insulating disk mounted on and sealed to the metal base member, and a metal frame embedded at its base in the insulating disk for supporting an electrode assembly. The result is a metal electron tube in which the electric weld between the metal parts of the envelope is uniformly strong and gas-tight, in which the lead-in wires are automatically insulated by the insulating disk through which they pass, and in which the electrode assembly is rigidly supported by a simple frame that is easily mounted on the disk. A tube like that can be made at less cost than metal tubes of prior construction.

In the all-metal tubes with which certain models of radio receivers have been equipped, the metal shell and base member or header are electrically welded together along an annular contact that is transversely flat and narrow. This welding operation requires extreme care to prevent burning and to insure complete contact all around. I obviate this difficulty by arching the metal parts transversely of the annular line of weld, so that a wider and more intimate contact is obtained. This arched weld is formed by providing the shell and base member with circular hollow beads which fit into each other and permit squeezing of the metal during the welding operation. In some instances I interpose a metal welding ring between the hollow beads. This arched weld is uniformly strong and gas-tight, with little or no danger of burning on account of the increased width of the welded area, so that an undue concentration of heat is avoided.

Further, in those prior all-metal radio tubes, the metal base member or header carries the electrodes and lead-in wires, which pass through holes in the header and must be separately insulated. This is usually accomplished by welding an alloy eyelet around each hole, sealing a small glass bead to each wire, and finally sealing the bead to the eyelet. The individual insulating mountings for the lead-in wires are not only expensive but at best produce an insulation limited by the narrow width of the tiny glass beads.

In my new tube, though it has a metal base member, no separate insulation is needed for the lead-in wires, for these pass through an insulating disk (usually of glass or porcelain) mounted on and sealed to the metal base member which is welded to the metal shell, as above explained. This insulating disk automatically insulates the lead-in wires and also carries the electrode assembly, for which I provide a novel support rigidly embedded in the disk and insulated thereby. As will appear later, the electrode-carrying disk may be sealed to the metal base member either before or after the base member is welded to the metal shell.

The various novel features and practical advantages of my new electron tube will be understood from a description of the accompanying drawing, in which:

Fig. 1 is a vertical section through a tube embodying my invention;

Fig. 2 is a transverse section on line 2—2 of Fig. 1;

Fig. 3 is an enlarged fragmentary view showing the metal parts of the tube in welding position;

Fig. 4 illustrates the electrode-supporting frame;

Fig. 5 is an enlarged view showing how the base portion of the electrode-supporting frame is embedded in the insulating base disk of the envelope;

Fig. 6 is a section on line 6—6 of Fig. 5;

Fig. 7 is an enlarged fragmentary view to show how an insulating cross piece may be secured to the top of the electrode-supporting frame;

Fig. 8 shows a modified construction of tube in vertical section;

Figs. 9—10 are enlarged fragmentary views showing how the metal shell and base member in Fig. 8 are welded together by an interposed metal ring; and Figs. 11—12 show two other modifications of the tube.

The tube structure shown in Figs. 1, 8, 11 and 12 comprises four main parts: a metal shell A, a metal base member B, an insulating disk C carried by the member B, and a base disk D of insulating material which forms the bottom of the tube. The metal parts A and B are shaped each in a single piece from sheet metal, such as steel, nickel, copper, aluminum, duralumin, and others found suitable for the purpose. Steel is probably the best metal to use, because it is cheap and strong, and being magnetic it acts as an electromagnetic shield for the electrodes in the tube. The insulating parts C and D are pressed or molded of suitable material, the disk C preferably of glass or porcelain, and the base D of vitreous material or a condensation product.

The metal shell A has a lateral flange 10 shaped to form a circular hollow bead or rib 12, which is common to all modifications shown. In Figs. 1, 11 and 12 the metal base member B has a similar bead or rib 13 formed in the lateral flange 14 and adapted to fit into the hollow bead 12. The metal parts A—B are electrically welded together across the transversely arched contact formed by the circular interfitting beads 12—13, this weld being represented diagrammatically and approximately by the dotted area W in Figs. 1, 2, 3, 11 and 12. The enlarged view of Fig. 3 shows how the welding is done. The two annular electrodes 15—16 are shaped at their ends to fit against the curved surfaces of the nested beads 12—13. When the electrodes, carrying the heating current, are suddenly forced together during the final upsetting pressure, the arched walls of the beads are squeezed together not only in the axial direction of the electrodes but also radially of the arches formed by the hollow beads. Consequently, the plastic contact surfaces of the compressed beads become molecularly united in a wide strong weld providing a uniformly gas-tight joint. The increased width of the weld W (due to its transverse curvature) practically eliminates the danger of burning, for the welding temperature is not highly concentrated (as in prior tubes) in a narrow line but is spread over a wider area. Even if an imperfect spot should occur here and there, the radial width of weld W insures perfect airtightness. Also, the transversely arched form of the weld facilitates self-adjustment of the hot welded surfaces on cooling, the arch 12—13 acting somewhat like an elastic hinge during the radial contracting movements of the rapidly cooling weld. This tends to reduce internal strains in the welded area. I believe that mild steel (that is, steel with a low carbon content) gives the best weld, as it passes through a plastic stage before welding temperature is reached.

Another form of electric weld for the metal parts A—B is shown in Figs. 8–10, where the lateral flange 14 of base member B has a circular hollow bead 13' curved downwardly opposite the bead 12 on shell A, so that an annular recess 17 is formed between the opposing beads 12—13'. In recess 17 is a sealing or welding ring 18 of suitable metal, preferably a non-ferrous metal softer than steel, such as copper. The normal diameter of ring 18 is preferably such that the flanges 10 and 14 of parts A and B are slightly separated before the welding pressure is applied, as shown in Fig. 9. When the annular electrodes 19—20, shaped to fit against the curved beads 12—13', are suddenly pressed together in the welding operation, the plastic wire ring 18 completely fills the recess 17 and integrally unites with the adjacent plastic surfaces of the beads to form a strong gas-tight weld approximately between the dotted lines W' in Fig. 10. This weld goes entirely across the interposed sealing ring 18 and it may even extend radially beyond either side of the ring to include direct welding contact between the steel flanges 10 and 14 of parts A and B, as the spacing of lines W' in Fig. 10 indicates. Otherwise, what has been said for weld W applies to weld W', and these two forms of weld are interchangeable in Figs. 1, 8, 11 and 12. That is to say, weld W may be substituted in Fig. 8, and weld W' may be employed in Figs. 1, 11 and 12.

In all the various forms shown, the metal base member B has a cylindrical flange 21 which is turned inwardly to form a flat annular shoulder 22. In Figs. 1 and 12 the shoulder or seat 22 is formed at the end of flange 21, while in Figs. 8 and 11 it is formed at the base of the flange. The shoulder 22 defines a central opening 23 closed by the insulating disk C, which is seated on or against the shoulder and is sealed to the cylindrical flange 21 by a fused glass ring 24. To seal the disk C in place, the metal base member B is suitably supported, the disk is seated on shoulder 22, the glass ring 24 is inserted in the groove around the disk, and while the assembled parts are slowly rotated, properly arranged gas jets melt the ring which flows into sealing contact with the metal flange 21 and the insulating disk C, whereby the latter is united to the metal base member B in a strong air-tight weld. When the disk C is of glass, it may also be fused directly to flange 21 of metal member B, but the use of a separate sealing ring facilitates the sealing operation and is necessary when the disk C is of porcelain or other refractory material.

The operation above described for sealing the vitreous disk C to the metal part B is equally applicable to the tubes of Figs. 1, 8, 11 and 12, except that in Figs. 1 and 11 the disk must be sealed in position before the member B is welded to shell A, while in Figs. 8 and 12 the disk may be mounted on member B after the latter has been welded to the shell. That is so because in Figs. 1 and 11 the annular base member B is supported right side up during the sealing of disk C, whereas in Figs. 8 and 12 the member B is held upside down during that sealing operation and the shell A, if previously welded to part B, would not be in the way. I might also point out that the shape of base member B in Fig. 1 is like that in Fig. 12, except that in the first instance the flange 21 projects down and in the second case up. The same comparison applies to the forms of part B in Figs. 8 and 11. When the flange 21 of base member B extends into the shell A, as in Figs. 11 and 12, the length of the tube is reduced, and that may be an advantage in some cases.

I will now describe my new support for the electrode assembly in the tube. For the purposes of this description I have assumed the tube shown in the drawing to be a radio tube having the usual electrodes—namely, a cathode filament 25, a grid 26, and a cylindrical anode 27. The filament 25 is supported by an insulated rod 28 sealed in disk C, the ends of the filament being welded to lead-in wires 29 passing through and sealed in the disk. The cathode 25, although shown as a filament, may also be of the indirectly heated type. The grid 26 and anode 27 are mounted on a metal frame indicated as a whole by F and comprising a pair of U-shaped brackets arranged at right angles, as seen in Fig. 4. One bracket has a pair of upright arms 30 to which the grid 26 is attached, and the other bracket has similar arms 31 for supporting the cylindrical anode 27. As seen in Fig. 2, the arms 30 are spaced closer together than the arms 31 for supporting the grid 26 within the anode 27. These two electrodes are welded or otherwise firmly secured to their respective arms 30—31. The grid 26 may be a perforated metal cylinder or a helix of stiff wire.

Each U-shaped bracket of support F is made from a single length of heavy wire or metal strip, and the two brackets are mounted centrally on the insulating disk C in substantially right-angled relation, as shown in Figs. 2 and 4. Each pair of vertical arms 30 and 31 is integrally connected by a cross piece 30' and 31' respectively, and each cross piece is embedded in a groove 32 in disk C. To prevent contact of the metal cross pieces 30'—31' with each other, so that the two brackets shall remain insulated, one of the cross pieces is either embedded deeper in the disk C than the other, or (as shown in Figs. 1 and 4) it is formed with a central hump 33 which avoids the other cross piece.

A simple way to embed the cross pieces 30'—31' of frame F in the molded disk C is to provide the top surface of the disk with a pair of grooves 32 arranged at right angles and shaped to receive the cross pieces, as shown in the enlarged view of Fig. 5. First, the U-shaped bracket is positioned on the disk C with the cross piece in the groove 32. Then a piece of glass 34 is placed in the groove over the cross piece and heat is applied to the glass, usually by means of gas jets. When the glass strip 34 becomes plastic, it completely fills the groove 32 and integrally unites with the vitreous disk C, as shown in Fig. 6, so that the underlying cross piece is solidly embedded in the disk. In this simple way the frame F is rigidly mounted on the insulating disk C and the electrodes are firmly supported. In some cases only one vertical arm 30—31 may be necessary for each bracket, which would then be L-shaped instead of U-shaped, but the method of sealing the cross piece of each L-shaped bracket in the disk C would be the same as described. If desired, the upper ends of arms 30—31 may be connected and braced by an insulating disk 35, as of mica, which is mounted on integral pins 36 extending from the arms. The bracing disk 35 is locked in position by flattening the ends of the pins at 36' (see Fig. 7).

One of each pair of arms 30—31 of the electrode-supporting frame F serves as an electrical connection. Thus, a lead-in wire 26' is welded to an arm 30 to connect the grid 26 in circuit, and another lead-in wire 27' is welded to an arm 31 for connecting the anode 27. The lead-in wires 26'—27' pass through and are sealed in the disk C. Since the latter is of insulating material, no separate individual insulation is necessary for the lead-in wires nor for the two metal brackets that carry the insulated electrodes 26 and 27.

To prevent needless repetition of illustration and description, the electrodes and their supporting frame are indicated diagrammatically in Figs. 8, 11 and 12. Thus, the rectangular outline E represents any practical construction and arrangement of electrodes, and the frame F is indicated by the U-shaped dotted lines 30 and 31, which in the broader aspect of my invention represent any suitable support for the electrode assembly.

In Figs. 1, 8 and 11 the sheet metal shell A is formed with an integral cylindrical extension or flange 37 to which the insulating base D is secured in any practical way, as by cement or by locking tongues 38 bent into corresponding slots 39 in the edge of the base D. The tongues 38 are formed in flange 37 by slitting the edge of the latter, and when peened into the slots 39 they clamp the base disk D rigidly in place, the inner side of the base disk abutting against the member B. In Fig. 12 the base D is secured in the same way to the cylindrical flange 37' formed integral on member B instead of shell A. It is evident that the cylindrical flange 37 in Figs. 1, 8 and 11 may be integral with member B, and that the flange 37' in Fig. 12 may be integral with shell A. In fact, after the parts A and B have been welded together as a unit, the flange 37 or 37' may be said to be integral either with the shell A or the base member B. In Figs. 1 and 8 the annular chamber 40 between the flanges 21 and 37 may have holes 40' for the passage of cooling air. The base disk D carries the usual contact pins 41 properly connected with the electrodes by wires indicated diagrammatically at 42 in Fig. 1.

Although I have shown and described certain specific constructions, my invention is not limited to the details set forth, for changes and modifications may be made within the scope of the appended claims. Further, it will be apparent that all the features of my invention need not be embodied in the same tube, for some features may be used without others. It is hardly necessary to add that the drawing has not been made with the mathematical accuracy of a shop drawing. On the contrary, I have purposely exaggerated the relative dimensions of the parts for clearness. The actual tube as used for radio receivers is much smaller and more compact than the illustrations.

I claim as my invention:

1. An electron tube comprising a metal shell and a metal base member, annular hollow beads on said shell and member arranged in interfitting contact, said shell and member being welded together across said interfitting beads, and electrodes in said shell.

2. An electron tube having an airtight envelope which includes two members of steel welded together along a circular contact by an interposed ring of different metal, and electrodes in said envelope.

3. An electron tube comprising a metal shell and a metal base member, each of said parts having an annular flange formed with an annular hollow bead, the two beads being arranged opposingly to form an annular recess, a separate metal ring in said recess welded to said beads, and electrodes in said shell.

4. An electron tube having a metal shell, a metal base member welded to said shell, said member having a central opening surrounded by an annular shoulder, an insulating disk engaging said shoulder and closing said opening, a sealing ring also engaging said shoulder and surrounding said disk, said ring forming an airtight seal between the insulating disk and the metal member, and electrodes carried by said disk.

5. An electron tube having an envelope which includes a metal base member provided with a central cylindrical flange and an annular shoulder, an insulating disk mounted within said flange and engaging said shoulder, the edge of said disk being slightly spaced from said flange to provide an annular groove, said shoulder closing one end of said groove, a ring in said groove for sealing the disk to the flange, and electrodes in said envelope carried by said disk.

6. An electron tube having an insulating disk at the base end of its envelope, a one-piece metal bracket comprising at least one vertical member and a horizontal base member which is embedded in said disk, whereby said bracket is rigidly supported on the disk, and an electrode attached to said vertical member.

7. An electron tube having a vitreous disk at the base end of its envelope, a metal bracket supported on said disk, said bracket including a horizontal base member held in a groove in said disk by a vitreous seal, and an electrode carried by said bracket.

8. An electron tube having an insulating disk at the base end of its envelope, a one-piece U-shaped metal frame supported by said disk, the horizontal member of said frame being embedded in the disk, and an electrode mounted on the two vertical members of said frame.

9. An electron tube having an insulating disk at the base end of its envelope, a pair of U-shaped metal frames supported by said disk approximately at right angles to each other, the horizontal members of said frames being embedded in said disk and insulated from each other, and an electrode carried by the two vertical members of each frame.

10. An electron tube having an insulating disk provided in its top surface with a pair of grooves extending approximately at right angles to each other, a metal member in each groove covered by a glass seal, so that each member is firmly embedded in the disk, means whereby said members are out of contact with each other at the point where they cross, said members being insulated from each other by said disk, each member having at least one vertical rod extending therefrom, and an electrode attached to the vertical rod of each member.

11. In the manufacture of electron tubes, the method of mounting an electrode-supporting member on a vitreous disk, said member having a vertical element and a horizontal base element, which method comprises forming said disk with a groove at the top, placing said base element in said groove, placing a correspondingly shaped piece of glass over the base element in the groove, and fusing said piece of glass, which becomes sealed to said base element and disk, whereby said base element is rigidly embedded in the vitreous disk to provide a firm mounting for said electrode-supporting member.

ADOLPH A. THOMAS.